United States Patent
Madeley

[19]

[11] Patent Number: 5,854,883
[45] Date of Patent: Dec. 29, 1998

[54] COLOR PROOFING METHOD PROVIDING ACCURATE VISUAL SIMULATION OF SCREENS

[76] Inventor: James Arthur Madeley, 4125 Trinity St., Burnaby, British Columbia, Canada, V5C-1N9

[21] Appl. No.: 630,914

[22] Filed: Apr. 4, 1996

[51] Int. Cl.$^6$ .................................................. H04N 1/52
[52] U.S. Cl. .......................................... 395/109; 358/537
[58] Field of Search ........................ 395/109; 382/237, 382/270, 299; 358/537, 534, 535, 501, 456, 298

[56] References Cited

U.S. PATENT DOCUMENTS

| | | | |
|---|---|---|---|
| 5,077,615 | 12/1991 | Tsuji | 358/298 |
| 5,200,831 | 4/1993 | Tai | 358/298 |
| 5,204,753 | 4/1993 | Tai | 358/298 |
| 5,208,871 | 5/1993 | Eschbach | 382/299 |
| 5,258,849 | 11/1993 | Tai | 358/298 |
| 5,258,850 | 11/1993 | Tai | 358/298 |
| 5,260,807 | 11/1993 | Tai | 358/456 |
| 5,289,294 | 2/1994 | Fujisawa | 358/461 |
| 5,291,311 | 3/1994 | Miller | 358/456 |
| 5,313,309 | 5/1994 | Tai | 358/455 |
| 5,359,431 | 10/1994 | Ng | 358/457 |
| 5,553,171 | 9/1996 | Lin et al. | 382/299 |

OTHER PUBLICATIONS

Papori Multilevel Halftoning by P. Delabastita.

*Primary Examiner*—Scott A. Rogers

[57] ABSTRACT

A proofing method enabling accurate visual simulation of high resolution screens, including all screening effects such as moire, uses a low resolution continuous tone proofer. The resolution and addressability of the proofer has to be better than the dot resolution of the screen, but can be much lower than the pixel resolution (a dot consists of at least 10×10 pixels). For example, a screen made of 3×3 pixels dots can simulate a screen made of 12×12 pixel binary dots if the grey scale of each one of the 3×3 dots is adjusted to kept the visual centroid of the 3×3 dot at the same position and intensity as the 12×12 pixel dot. The low spatial resolution of the unaided eye cannot see the difference between the two screens.

5 Claims, 1 Drawing Sheet

COLOR PROOFING METHOD PROVIDING ACCURATE VISUAL SIMULATION OF SCREENS

BACKGROUND OF THE INVENTION

The invention relates to printing and more specifically, to the step known as electronic color proofing, in which a color image is generated from the electronic data files before the printing press is used. Proofers are available in two versions; halftone proofers (also known as dot proofers) and continuous tone proofers. The halftone proofers, when run from the same raster as is used to generate the printing plates, provide the most accurate proof as any screening effects such as moire will show up, as well as any color shifts. Unfortunately, these proofers are expensive and relatively slow due to the large amounts of data involved. A well known example of such a proofer is the Approval system manufactured by Kodak (Rochester, N.Y.). The continuous tone proofers use a combination of continuous tones and low resolution screens to accurately reproduce the colors in the printed material, but cannot reproduce effects caused by the specific screening used on the printing plates, such as moire, graininess, contouring, etc. Some moire prediction algorithms exist, however they require large computational resources. The lack of exact screen dot reproduction has been the largest disadvantage of continuous tone proofers. A well known example of such a proofer is the Iris system made by Scitex (Boston, Mass.) and the Rainbow system, made by 3M (Minneapolis, Minn.).

It is the object of the present invention to have a low resolution continuous tone proofer generate accurate halftone proofs (dot proofs) which are indistinguishable to the unaided eye from true halftone proofs. These proofs will be able to predict all artifacts a true dot proof can predict, such as moire, contouring, etc. A further object is to generate these proofs at high speed and low cost, compared to true dot proofing, as the resolution and amount of data required is significantly less. For example, a 16×16 pixel screen dot required 256 bits or 32 bytes will be proofed using a 3×3 pixel dot, each pixel having 256 grey level (1 byte), thus required 9 bytes. There are numerous prior art algorithms to replace high resolution (normally measured in DPI, or dots per inch) binary pixels by low spatial resolution plus intensity resolution (grey scale). All these algorithms use a combination of screening and grey scale to generate the visual quality of a high DPI binary screen, but do not attempt to exactly replicate the screen structure of the original screen, thus they do not allow the proof to generate all screening artifacts as the printed material. The most notable prior art are U.S. Pat. Nos. 5,359,431; 5,313,309; 5,291,311; 5,289,294; 5,260,807; 5,258,850; 5,258,849; 5,204,753; 5,200,831; 5,077,615 plus a paper presented by Paul Delabastita of Agfa at the 1995 IS&T conference on printing (Chicago, 1995). Proofs made according to the prior art will have the correct colors but will not display a dot structure indistinguishable to the unaided eye from the printed material or from a true dot proof.

BRIEF DESCRIPTION OF THE INVENTION

The present invention uses a proofer with a lower resolution than the device used to make the printing plate. In order to achieve identical visual appearance as the print, or a true dot proof, two conditions have to be met: each screen dot has to be at the exact position and exact overall density as the printed matter. The exact overall density can be easily matched, even at low resolution, if grey scales (continuos tone) are used. In order to achieve an exact position match between the low resolution dot and the real screen dot the invention takes advantage of the spatial filtering effect of the unaided eye. Screen dots, when filtered by the unaided eye, create a visual impression of nearly sinusoidal modulation. Lower resolution dots will create an identical impression if the density centroid of the dot is adjusted to match the position of the density centroid of the print dot. As the low resolution dot is still broken down into pixels (typically 3×3 or 4×4), the position of the density centroid can be adjusted by the relative density of those pixels. When the density centroid and total density match the printed dot (or the dot proofer dot), the observer will not be able to tell the low resolution proof apart from a true dot proof.

DESCRIPTION OF THE PREFERRED EMBODIMENT

Figure 1:
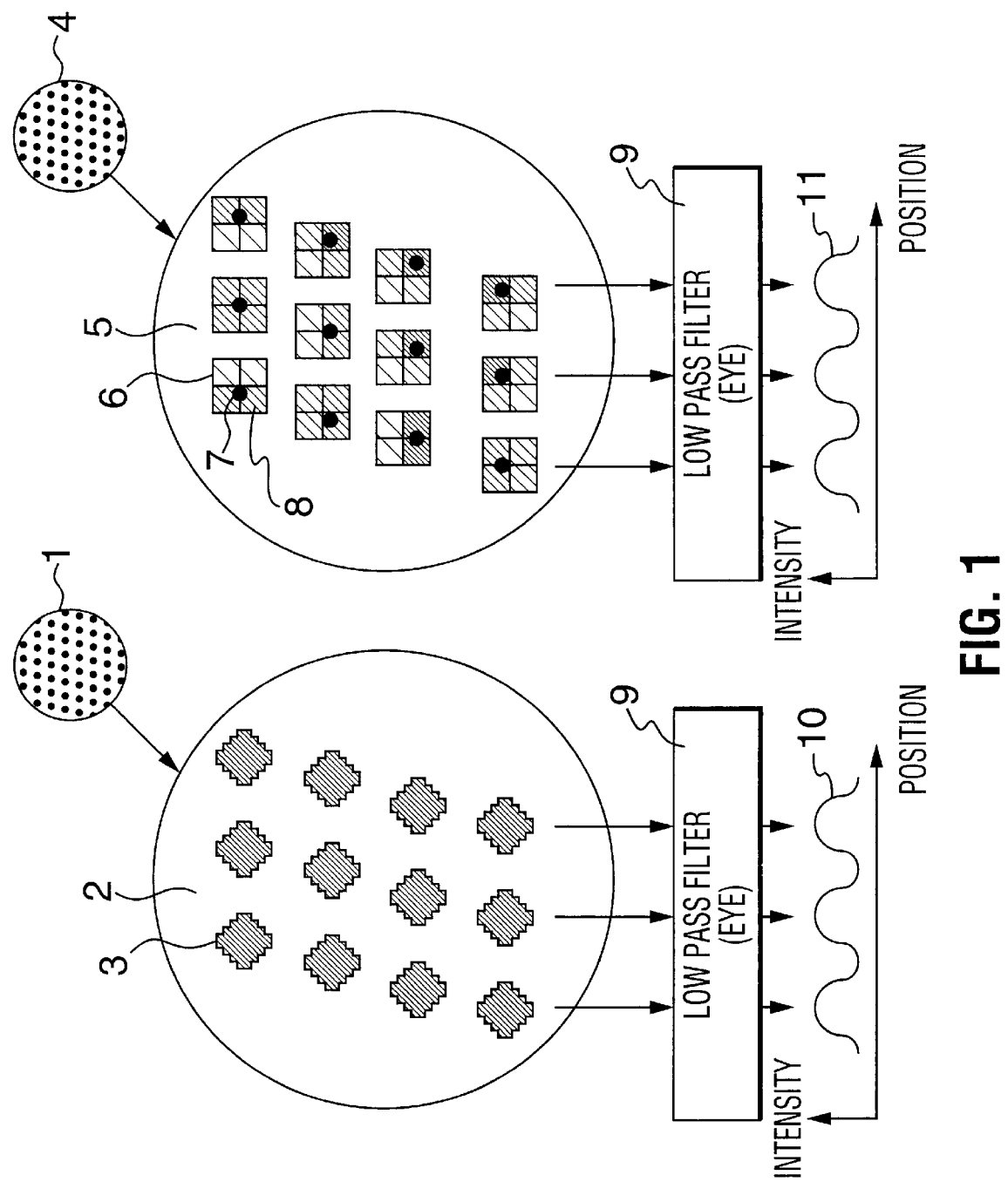
FIG. 1 shows a magnified view of two screens; a true screen and a low pixel resolution screen designed to create an identical visual effect by using the present invention.

Most printing screens are used in resolutions of 80 to 250 Lines Per Inch, also known as LPI (30 to 100 l/cm). The visual acuity of the unaided eye is about one minute of arc, which translates into about 0.1 mm resolution at normal viewing distance. The optical modulation of a "just resolved" object is quite low, in the order of 10 to 20% modulation, therefore, even a 50% screen at a coarse 30 l/cm is not fully resolved by the eye (i.e. optical modulation is less than 100%). This allows the substitution of other screens giving the same visual perception as long as two conditions are met: the average intensity is identical to the original screen and the density centroid of the screen dots is at an identical position to the centroid of the higher resolution dot. The eye acts as a low-pass filter, passing only the zero and first harmonic (also known as the fundamental) components of the screen (the zero component is the average grey level). The current invention takes advantage of this effect to generate dot proofs of the highest quality at a resolution and data rate which is a fraction of a conventional dot proof.

Referring now to FIG. 1, screen 1 is shown enlarged as 2. Dots 3 are made up of a grid of pixels. In this example, the dots 3 are drawn on a 13×13 pixel grid, giving 169 grey levels. The grey level equals the number of pixels which are on compared to the maximum number of 169. For example, each dot 3 consists of 2(2+4+6+8)=40 pixels, generating a grey level of 40/169=23.7%. After the low pass spatial filter effect of the eye 9, the visual impression created by this screen is shown by graph 10. The finer the screen the lower will be the modulation shown by graph 10. The example shown corresponds to a fairly coarse screen. The same visual appearance of screen 1 can be created by screen 4, shown enlarged as 5. Each screen dot 6 is made up of four pixels 8 (out of a maximum cell size of 3×3 pixels). As the grid of pixels 8 is not always an integer multiple of the grid of the pixels making up dots 3, and as the screen 2 can be rotated, which is common in printing (the common screen angles being 0°, 15°, 45° and 75°) the centers of dots 6 will not align with the centers of dot 3. If this error was left uncorrected new artifacts would be generated and artifacts present in original screens, such as moire between screens, may be hidden. Moire is an optical beat between two or more screens and is a function of the exact location of screen dots. To adjust the visual centroid of dot 8 to coincide with the centroid of dot 3 the relative density of pixels 8 is being adjusted. In FIG. 1, dot 7 indicates the desired position of the density centroid, which matches the centroid of dot 3. Needless to say, dot 7 is only shown in FIG. 1 as a marker and is not shown in the real proof. Different densities are shown in FIG. 1 as different hatch densities. The denser hatch represents a higher color density (darker shade of the color).

In order for screen 5 to generate an identical visual image (to the unaided eye) as screen 2, two conditions have to be met: a) the average density of the two screens has to match and b) the density centroids of dots 6 has to match those of dot 3 (in both dimensions). This is satisfied by the well known process of resampling. Screen 2 is a high resolution binary image. The low pass filtered version 10 is no longer high resolution, thus it can be resampled into a lower resolution grey scale image 5, as long as the Nyquist criteria is satisfied. This means that as long as the resolution of pixels 8 (in terms of pixels per cm or inch) exceed the resolution of dots 3 (dots, not pixels), image 2 can be resampled into a lower resolution image 5, as far as the first harmonic is concerned. In order to make the resampling easier it is desired not to operate close to the Nyquist limit, thus a good guideline is to have 2 or 3 pixels 8 for each dot 3. Another reason for that is that the eye may be able to pick up more than the first harmonic (also known as the fundamental frequency) of image 2. The process of resampling, and in particular digital resampling, is well known and need not be discussed here. It is also supported by some of the newer Raster Image Processors (RIP) used in the graphic arts, such as Harlequin. Block 9 in FIG. 1 represents the low pass filter of the unaided eye, capable of transmitting only the first harmonic of the image for image details closer than approximately one minute of arc. This first harmonic 10 for screen 2 appears identical to first harmonic 11 for screen 5. The graphs 10, 11 are shown as a one dimensional function. It is understood that a similar response will be derived from the other dimension.

Since most printing is done in CMYK (Cyan/Magenta/Yellow/Black) colors, while many color proofing materials respond to RGB (Red/Green/Blue) colors, a color transformation is required. This is handled by such well known programs as PhotoShop® by Adobe®. No details of this transform are given as it is a standard and well known process. This is also true when an electronic display, such as a color CRT is used as the proofing device. This is also known as "soft proofing". As displays use RGB, a color transform from CMYK to RGB is required.

EXAMPLE

An 150 LPI screen generated at 2400 DPI (16×16 pixels per dot) was generated for each one of the CMYK layers. To proof the resultant of those screens, a grey-scale 600 DPI color proofer was used. The 150 LPI image was resampled into a 150 LPI 600 DPI screen (4×4 pixels per dot) using the cubic convolution algorithm. A proof was generated on photographic paper using RGB signals by mapping the CMYK into RGB. The visual effect was identical to a true dot proof.

What is claimed is:

1. A color proofing method for pre-press proofing of binary halftone color printing capable of displaying artifacts caused by the halftoning process using halftone screens, comprising of the following steps:

generating one electronic screen for each color used, using a sampling grid of lower resolution than said halftone screens, said samples on lower resolution grid having more than two density levels, while maintaining at least the fundamental frequency of said halftone screen and generating color composite proof from said electronic screens.

2. A method as disclosed in claim 1 containing the extra step of color transformation from the set of colors used in the printing process to the set of colors used by the color proofing.

3. A method as disclosed in claims 1 and 2 wherein the printing process is done in Cyan/Magenta/Yellow/Black (CMYK) while the proofing material responds to Red/Green/Blue (RGB).

4. A method as disclosed in claim 1 wherein the generated color proof is a hardcopy proof.

5. A method as disclosed in claim 1 wherein the generated color proof is a soft proof, viewed on an electronic display.

* * * * *